United States Patent

Dzwiniel et al.

(10) Patent No.: US 10,622,675 B2
(45) Date of Patent: Apr. 14, 2020

(54) SOLVENT FOR NON-AQUEOUS BATTERY

(71) Applicant: UCHICAGO ARGONNE, LLC, Chicago, IL (US)

(72) Inventors: Trevor L. Dzwiniel, Carol Stream, IL (US); Krzysztof Pupek, Plainfield, IL (US); Gregory K. Krumdick, Homer Glen, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 64 days.

(21) Appl. No.: 15/971,135

(22) Filed: May 4, 2018

(65) Prior Publication Data

US 2019/0341653 A1  Nov. 7, 2019

(51) Int. Cl.
*H01M 10/0565* (2010.01)
*H01M 10/052* (2010.01)
(Continued)

(52) U.S. Cl.
CPC ......... *H01M 10/0565* (2013.01); *C08L 71/02* (2013.01); *H01M 10/052* (2013.01);
(Continued)

(58) Field of Classification Search
CPC ........... H01M 10/0565; H01M 10/052; H01M 2300/0028; C08L 71/02
See application file for complete search history.

(56) References Cited

U.S. PATENT DOCUMENTS

2007/0048260 A1* 3/2007 Novak ............... A01K 67/0275
424/85.1
2017/0301953 A1* 10/2017 Pena Hueso ............ C07F 7/12

FOREIGN PATENT DOCUMENTS

JP  10-172610 A  6/1998

OTHER PUBLICATIONS

Jow, T.R. et al. (eds), Electrolytes for Lithium and Lithium-Ion Batteries, Nonaqueous Electrolytes and Advances in Additives, Chapter 3, 167-190 (2014).
(Continued)

*Primary Examiner* — Stewart A Fraser
(74) *Attorney, Agent, or Firm* — Olson & Cepuritis, Ltd.; Robert J. Ross

(57) ABSTRACT

A solvent useful for lithium batteries comprises a compound of Formula (I): $(R^1)(R^2)(R^3)Si-R^4-O-C(O)-[(O-R^5)_n-(O-C(O)]_m-O-R^6-X^1$. Each of $R^1$ and $R^2$ independently is alkyl; $R^3$ is alkyl, $-X^2-Si(R^7)(R^8)(R^9)$, or $-CH_2-O-C(O)-O-R^{10}$; $X^1$ is H or $-Si(R^{11})(R^{12})(R^{13})$; each of $R^4$ and $R^6$ independently is alkylene; each $R^5$ independently is $C_2$ to $C_6$ alkylene; each of $R^7$, $R^8$, $R^9$, and $R^{10}$ independently is alkyl; $X^2$ is O or alkylene; each of $R^{11}$ and $R^{12}$ independently is alkyl; $R^{13}$ is alkyl or $-X^3-Si(R^{14})(R^{15})(R^{16})$; each of $R^{14}$, $R^{15}$, and $R^{16}$ independently is alkyl; $X^3$ is O or alkylene; m is 0 or 1, and n is 1-3; and when m is 0 and $R^3$ is alkyl, $X^1$ is $-Si(R^{11})(R^{12})(R^{13})$. Also described is a method for manufacturing a compound of Formula (II): $(R^{17})(R^{18})(R^{19})Si-CH_2-O-C(O)-O-R^{20}$ where each $R^{17}$, $R^{18}$, $R^{19}$, and $R^{20}$ is alkyl.

25 Claims, 9 Drawing Sheets

(51) Int. Cl.
*C08L 71/02* (2006.01)
*H01M 4/131* (2010.01)
(52) U.S. Cl.
CPC ......... *C08L 2203/20* (2013.01); *H01M 4/131* (2013.01); *H01M 2300/0028* (2013.01)

(56) References Cited

OTHER PUBLICATIONS

Krumdick, G., Battery Materials Scale-Up and Manufacturing Research, Getting Materials From Discovery to Production, Battery Congress 2017, 1-34, May 10, 2017.
Krumdick, G., Battery Materials Scale-Up and Manufacturing Research, Getting Materials From Discovery to Production, International Battery Seminar, 1-30, Mar. 23, 2017.
Long, B.R. et al., Enabling High-Energy, High-Voltage Lithium-Ion Cells: Standardization of Coin-Cell Assembly, Electrochemical Testing, and Evaluation of Full Cells, Journal of the Electrochemical Society, 163 (14), A2999-A3009 (2016).

* cited by examiner

SOLVENT FOR NON-AQUEOUS BATTERY

The United States Government has rights in this invention pursuant to Contract No. DE-AC02-06CH11357 between the United States Government and UChicago Argonne, LLC representing Argonne National Laboratory.

FIELD OF THE INVENTION

This invention relates to non-aqueous solvents and electrolytes for electrochemical cells and batteries. More particularly, this invention relates to silyl-substituted alkyl carbonate solvents and electrolytes comprising the solvents, as well as electrochemical cells, and batteries comprising the electrolytes.

BACKGROUND

The use of high-voltage, high-capacity positive electrodes in lithium-ion batteries is complicated by their tendency to degrade organic electrolyte solvents. Additionally, organic electrolyte solvents can have flammability issues, particularly when the batteries are subjected to excessive temperatures. Additives to improve thermal stability have been proposed for lithium batteries, as have flame resistant solvents. Various additives have been proposed that limit flame propagation or have flame retardant properties. Generally, these additives decrease the performance of the cell. The trade-off of the flame-suppressant properties interfere with the general operation of the battery, resulting in a poor overall product.

There is an ongoing need for advanced electrolyte solvents having one or more properties such as a large electrochemical stability window, a high ionic conductivity with a very low electronic conductivity, a low vapor pressure and low viscosity over a broad temperature range, and a lower flammability (e.g., due to a higher flash point) than conventional carbonate solvents. The solvents, electrolytes, electrochemical cells, batteries and methods described herein address this ongoing need.

SUMMARY OF THE INVENTION

Electrolyte solvents useful for non-aqueous electrochemical cells and batteries (e.g., lithium batteries) are described herein. A preferred solvent comprises a compound of Formula (I): $(R^1)(R^2)(R^3)Si-R^4-O-C(O)-[(O-R^5)_n-(O-C(O)]_m-O-R^6-X^1$. Each $R^1$ and $R^2$ in Formula (I) independently is alkyl (e.g., $C_1$ to $C_6$ alkyl); $R^3$ is alkyl (e.g., $C_1$ to $C_6$ alkyl), $-X^2-Si(R^7)(R^8)(R^9)$, or $-CH_2-O-C(O)-O-R^{10}$; $X^1$ is H or $-Si(R^{11})(R^{12})(R^{13})$; each $R^4$ and $R^6$ independently is alkylene (e.g., $C_1$ to $C_6$ alkylene); and $R^5$ is $C_2$ to $C_6$ alkylene (e.g., $-CH_2CH_2-$ or $-CH(CH_3)CH_2-$). Additionally, each $R^7$, $R^8$, $R^9$, and $R^{10}$ in Formula (I) independently is alkyl (e.g., $C_1$ to $C_6$ alkyl); $X^2$ is O or alkylene (e.g., $C_1$ to $C_6$ alkylene); each $R^{11}$ and $R^{12}$ independently is alkyl (e.g., $C_1$ to $C_6$ alkyl); $R^{13}$ is alkyl (e.g., $C_1$ to $C_6$ alkyl) or $-X^3-Si(R^{14})(R^{15})(R^{16})$; each $R^{14}$, $R^{15}$, and $R^{16}$ independently is alkyl (e.g., $C_1$ to $C_6$ alkyl); and $X^3$ is O or alkylene (e.g., $C_1$ to $C_6$ alkylene). In some embodiments the compounds of Formula (I) comprise alkylene oxide carbonate groups of formula: $-[(O-R^5)_n-(O-C(O)]_m-O-R^6-X^1$ where m is 1, and n is 1, 2 or 3. In other embodiments, m is 0 and there are no $-[(O-R^5)_n-(O-C(O)]_m-O-R^6-X^1$ groups in the compound. In Formula (I), when m is 0 and $R^3$ is alkyl, then $X^1$ is $-Si(R^{11})(R^{12})(R^{13})$.

Also described herein is a continuous process for manufacturing a compound of Formula (II): $(R^{17})(R^{18})(R^{19})Si-CH_2-O-C(O)-O-R^{20}$ where each $R^{17}$, $R^{18}$, $R^{19}$, and $R^{20}$ is alkyl (e.g., a $C_1$ to $C_6$ alkyl; preferably methyl or ethyl). The process comprises passing a solution of a silyl alcohol of formula $(R^{17})(R^{18})(R^{19})Si-CH_2-OH$ in a molar excess (preferably a molar excess about 2:1 to about 15:1, more preferably about 3:1 to 10:1) of a liquid dialkyl carbonate of formula $R^{20}O-C(O)-O-R^{20}$ (e.g., dimethyl carbonate or diethyl carbonate) through a heated tubular flow reactor containing an alumina catalyst (e.g., neutral alumina or basic alumina, optionally in the presence of up to about 10 wt % (e.g., 2 wt %, 3 wt %, 4 wt % or 5 wt %) of a basic metal salt such as $Zn(OH)_2$, $Mg(OH)_2$, $K_3PO_4$, KOH, NaOH, $Ca(OH)_2$, and KF. The solution is passed through a heated flow reactor containing the catalyst at a temperature in the range of about 120° C. to about 160° C., and a pressure sufficient to maintain the dialkyl carbonate below its boiling point (e.g., a pressure of greater than 1.5 bars, or preferably about 2 to about 15 bars), with a residence time of about 0.5 to about 20 minutes (e.g., about 2 to about 10 minutes) within the reactor. The effluent exiting the reactor is collected and distilled to obtain the compound of Formula (II). In some embodiments a molar excess of dialkyl carbonate to silyl alcohol of about 4:1 to about 5:1 is preferred.

The solvents described herein have surprisingly good solubilizing properties for salts commonly used in lithium battery electrolytes, as well as excellent chemical compatibility and electrochemical stability properties. Batteries utilizing the silylated solvents of Formulas (I) and (II) provide capacities similar to batteries comprising a conventional 3:7 (w/w) solvent mixture of ethylene carbonate and methyl ethyl carbonate, respectively (also known as Gen2 solvent), and exhibit coulombic efficiencies near 100%, when evaluated in a lithium-ion battery with 1.0 M $LiPF_6$ as the electrolyte salt, a graphite-based anode, and a lithium nickel-cobalt-manganese dioxide-based cathode.

Certain non-limiting embodiments of the solvents, electrochemical cells, batteries and methods described herein are provided below to illustrate certain aspects of the present invention.

Embodiment 1 comprises a solvent compound of Formula (I): $(R^1)(R^2)(R^3)Si-R^4-O-C(O)-[(O-R^5)_n-(O-C(O)]_m-O-R^6-X^1$; wherein:
each $R^1$ and $R^2$ independently is alkyl;
$R^3$ is alkyl, $-X^2-Si(R)(R^8)(R^9)$, or $-CH_2-O-C(O)-O-R^{10}$;
each $R^7$, $R^8$, $R^9$, and $R^{10}$ independently is alkyl;
each $R^4$ and $R^6$ independently is alkylene;
$R^5$ is $C_2$ to $C_6$ alkylene;
$X^1$ is H or $-Si(R^{11})(R^{12})(R^{13})$;
$X^2$ is O or alkylene;
each $R^{11}$ and $R^{12}$ independently is alkyl;
$R^{13}$ is alkyl or $-X^3-Si(R^{14})(R^{15})(R^{16})$;
each $R^{14}$, $R^{15}$, and $R^{16}$ independently is alkyl;
$X^3$ is O or alkylene;
n is 1, 2, or 3; and
m is 0 or 1;
with proviso that when m is 0 and $R^3$ is alkyl, then $X^1$ is $-Si(R^{11})(R^{12})(R^{13})$.

Embodiment 2 comprises the compound of Embodiment 1, wherein m is 1; and n is 1 or 2.

Embodiment 3 comprises the compound of Embodiment 1 or 2, wherein $R^3$ is $C_1$ to $C_6$ alkyl.

Embodiment 4 comprises the compound of any one of Embodiments 1 to 3, wherein each of $R^4$ and $R^6$ is $-CH_2-$.

Embodiment 5 comprises the compound of any one of Embodiments 1 to 4, wherein each of $R^1$, $R^2$, $R^3$, $R^{11}$, and $R^{12}$ is methyl.

Embodiment 6 comprises the compound of any one of Embodiments 1 to 5, wherein each $R^5$ independently is $C_2$ to $C_3$ alkylene.

Embodiment 7 comprises the compound of any one of Embodiments 1 to 6, wherein $X^1$ is H.

Embodiment 8 comprises the compound of Embodiment 1, wherein m is 1; n is 1 or 2; each of $R^1$, $R^2$, $R^3$, $R^7$, $R^8$, $R^9$, $R^{11}$, $R^{12}$, and $R^{13}$ is methyl; each $R^5$ independently is $C_2$ to $C_3$ alkylene; and each of $R^4$ and $R^6$ is —$CH_2$—.

Embodiment 9 comprises the compound of Embodiment 1, wherein m is 1; n is 1 or 2; and $R^3$ is —$X^2$—Si($R^7$)($R^8$)($R^9$).

Embodiment 10 comprises the compound of Embodiment 9, wherein each of $X^2$, $R^4$ and $R^6$ is —$CH_2$—.

Embodiment 11 comprises the compound of Embodiment 9 or 10, wherein $R^{13}$ is —$X^3$—Si($R^{14}$)($R^{15}$)($R^{16}$); and each of $R^1$, $R^2$, $R^7$, $R^8$, $R^9$, $R^{11}$, $R^{12}$, $R^{14}$, $R^{15}$, and $R^{16}$ is methyl.

Embodiment 12 comprises the compound of any one of Embodiments 9 to 11, wherein each $R^5$ independently is $C_2$ to $C_3$ alkylene.

Embodiment 13 comprises the compound of any one of Embodiments 9 to 11, wherein $X^1$ is H.

Embodiment 14 comprises the compound of Embodiment 1, wherein m is 1; n is 1 or 2; $R^3$ is —$CH_2$—Si($R^7$)($R^8$)($R^9$); each of $R^1$, $R^2$, $R^7$, $R^8$, $R^9$, $R^{11}$, and $R^{12}$ is methyl; $R^{13}$ is methyl or —$CH_2$—Si($CH_3$)$_3$; each $R^5$ independently is $C_2$ to $C_3$ alkylene; and each of $R^4$ and $R^6$ is —$CH_2$—.

Embodiment 15 comprises the compound of Embodiment 1, wherein m is 0; and $R^3$ is —$CH_2$—O—C(O)—O—$R^{10}$.

Embodiment 16 comprises the compound of Embodiment 14 or 15, wherein each of $R^4$ and $R^6$ independently is $C_1$ to $C_6$ alkylene; $X^1$ is H; and $R^{10}$ is $C_1$ to $C_6$ alkyl.

Embodiment 17 comprises an electrolyte for a non-aqueous lithium battery comprising a lithium salt dissolved in a solvent comprising at least one compound of any one of Embodiments 1 to 16.

Embodiment 18 comprises the electrolyte of Embodiment 17, wherein the solvent further comprises one or more additional solvent compound selected from the group consisting of solvent selected from an ether, a carbonate ester, a linear dialkyl carbonate, a cyclic alkylene carbonate, a nitrile, a sulfoxide, a sulfone, a fluoro-substituted linear dialkyl carbonate, a fluoro-substituted cyclic alkylene carbonate, a fluoro-substituted sulfolane, a fluoro-substituted sulfone, and a compound of Formula (II): ($R^{17}$)($R^{18}$)($R^{19}$)Si—$CH_2$—O—C(O)—O—$R^{20}$, wherein each of $R^{17}$, $R^{18}$, $R^{19}$, and $R^{20}$ independently is $C_1$ to $C_6$ alkyl. In some embodiments, the additional solvent may be present in the electrolyte in any suitable concentration, e.g., at a concentration up to about 98 percent by weight (wt %).

Embodiment 19 comprises the electrolyte of Embodiment 17 or 18, wherein the lithium salt comprises one or more salt selected from the group consisting of lithium bis(trifluoromethanesulfonyl)imidate, lithium 2-trifluoromethyl-4,5-dicyanoimidazolate, lithium 4,5-dicyano-1,2,3-triazolate, lithium trifluoromethanesulfonate, lithium perchlorate, lithium bis(oxalato)borate, lithium difluoro(oxalato)borate, lithium tetrafluoroborate, lithium hexafluorophosphate, lithium thiocyanate, lithium bis(fluorosulfonyl)imidate, lithium bis(pentafluoroethylsulfonyl)imidate, lithium tetracyanoborate, and lithium nitrate. The salt may be present in the electrolyte in any suitable concentration, e.g., at a concentration in the range of about 0.1 to about 3 M.

Embodiment 20 comprises a lithium electrochemical cell comprising an anode, a cathode, and an electrolyte of any one of Embodiments claim 17 to 19 contacting the anode and cathode.

Embodiment 21 comprises a lithium battery comprising a plurality of the electrochemical cells of Embodiment 20 electrically connected together in series, in parallel, or in both series and parallel.

Embodiment 22 comprises a continuous method of manufacturing a compound of Formula (II): ($R^{17}$)($R^{18}$)($R^{19}$)Si—$CH_2$—O—C(O)—O—$R^{20}$, wherein each of $R^{17}$, $R^{18}$, $R^{19}$, and $R^{20}$ independently is $C_1$ to $C_6$ alkyl; the method comprising passing a solution of a silyl alcohol of formula ($R^{17}$)($R^{18}$)($R^{19}$)Si—$CH_2$—OH in a molar excess of a liquid dialkyl carbonate of formula $R^{20}$O—C(O)—O—$R^{20}$ through a heated flow reactor (e.g., a heated tubular reactor) containing or packed with a neutral or basic alumina catalyst, optionally in the presence of up to about 10 percent by weight (wt %) of a basic metal salt, at a temperature in the range of about 120° C. to about 160° C., and a pressure sufficient to maintain the dialkyl carbonate below the boiling point thereof, with a residence time of about 0.5 to about 20 minutes within the reactor; collecting an effluent comprising the compound of Formula (II) exiting from the reactor; and distilling the effluent to isolate the compound of Formula (II).

Embodiment 23 comprises the method of Embodiment 22, wherein each $R^{20}$ of the dialkyl carbonate is methyl or ethyl.

Embodiment 24 comprises the method of Embodiment 22 or 23, wherein each of $R^{17}$, $R^{18}$, and $R^{19}$ is methyl.

Embodiment 25 comprises the method of any one of Embodiments 22 to 24, wherein the alumina catalyst is a basic alumina catalyst.

Embodiment 26 comprises the method of any one of Embodiments 22 to 25, wherein the alumina catalyst is a basic alumina catalyst and the molar excess of dialkyl carbonate relative to the silyl alcohol is in the range of about 3:1 to about 10:1.

DETAILED DESCRIPTION

Electrolyte solvents for non-aqueous electrochemical cells and batteries are described herein. A preferred solvent comprises a compound of Formula (I) as described herein.

Figure 1:
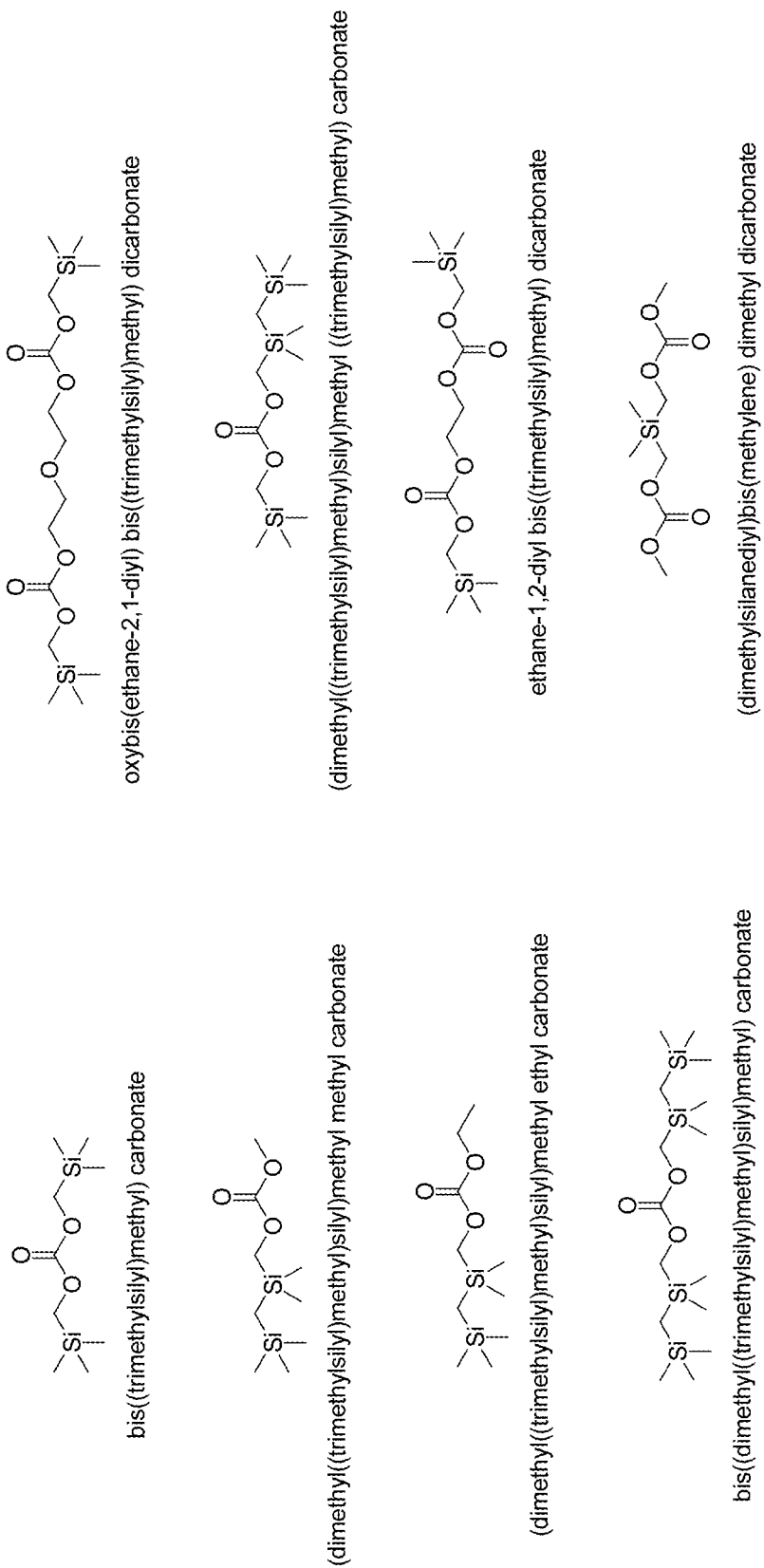
FIG. 1 illustrates selected examples of compounds of Formula (I).

FIG. 1 provides non-limiting examples of selected compounds of Formula (I). The solvents of Formula (I) have surprisingly good solubilizing characteristics for dissolving salts commonly used in electrolytes for lithium battery electrolytes. The solvents of Formula (I) also have excellent chemical compatibility and electrochemical stability with anode and cathode materials used in lithium batteries properties during battery charging and discharging. The silyl groups of the solvents of Formulas (I) also provide reduced flammability relative to common organic carbonates used in lithium battery applications. Optionally, the electrolyte solvents also can comprise a compound of Formula (II) as described herein.

Compounds of Formula (I) and Formula (II) can be prepared in a variety of ways, e.g., by displacement of one or more alkyl group of a dialkyl carbonate by a silyl-substituted alcohol. For example, a compound of Formula (I) in which m is 0 and $X^1$ is H can be prepared by reacting a silyl alcohol of formula $(R^1)(R^2)(R^3)Si$—$R^4$—OH with a molar excess of a dialkyl carbonate of formula $X^1$—$R^6$—O—C(O)—O—$R^6$—$X^1$ (e.g., a molar excess about 2:1 to about 15:1, preferably about 3:1 to 10:1, more preferably about 4:1 to about 5:1 dialkyl carbonate:silyl alcohol) in the presence of a catalyst. Similarly, a compound of Formula (I) in which m is 0 can be prepared by reacting a silyl alcohol of formula $(R^1)(R^2)(R^3)Si$—$R^4$—OH with a molar excess of a dialkyl carbonate (e.g., a molar excess about 2:1 to about 15:1, preferably about 3:1 to 10:1, more preferably about 4:1 to about 5:1 dialkyl carbonate:silyl alcohol) to displace one alkyl group of the dialkyl carbonate and form an intermediate compound of formula $(R^1)(R^2)(R^3)Si$—$R^4$—O—C (O)—O-Alkyl, and then reacting the intermediate with an alcohol of formula HO—$R^6$—$X^1$, where $X^1$ is H or —Si $(R^{11})(R^{12})(R^{13})$, to displace the O-Alkyl group from the intermediate.

A compound of Formula (I) in which m is 1 can be prepared by reacting a silyl alcohol of formula $(R^1)(R^2)(R^3) Si$—$R^4$—OH with a molar excess of a dialkyl carbonate (e.g., a molar excess about 2:1 to about 15:1, preferably about 3:1 to 10:1, more preferably about 4:1 to about 5:1 dialkyl carbonate:silyl alcohol) to displace one alkyl group of the dialkyl carbonate and form an intermediate compound of formula $(R^1)(R^2)(R^3)Si$—$R^4$—O—C(O)—O-Alkyl, followed by reacting the intermediate with an alkylene glycol HO—$R^5$—OH, so that each hydroxyl group of the glycol displaces an alkoxy group from a molecule of the intermediate.

In some embodiments, the catalyst for preparing the compounds of Formulas (I) and (II) is a particulate heterogeneous catalyst (i.e., insoluble in the reaction mixture). For example, in some embodiments the catalyst is a basic material, e.g., basic alumina, a basic salt, or alumina in the presence of up to about 10 wt % (e.g., 2 wt %, 3 wt %, 4 wt % or 5 wt %) of a basic salt such as $Zn(OH)_2$, $Mg(OH)_2$, $K_3PO_4$, KOH, NaOH, $Ca(OH)_2$, and KF. Preferably, the catalyst is basic alumina.

In a batch process, the catalyst preferably is present at a concentration of about 0.01 to about 20 wt % (e.g., about 0.1 to about 5 wt %). If desired, the reaction can be carried out in a flow reactor packed with the catalyst, so that the reaction mixture flows through a bed or packed tube of the particulate catalyst.

Also described herein is a continuous process for manufacturing a compound of Formula (III): $(R^{17})(R^{18})(R^{19})Si$—$CH_2$—O—C(O)—O—$R^{20}$ where each of $R^{17}$, $R^{18}$, $R^{19}$, and $R^{20}$ independently is alkyl (e.g., $C_1$ to $C_6$ alkyl, such as methyl or ethyl). The process comprises passing a solution of a silyl alcohol of formula $(R^{17})(R^{18})(R^{19})Si$—$CH_2$—OH dissolved in a molar excess of a liquid dialkyl carbonate of formula $R^{20}O$—$C(O)$—$O$—$R^{20}$ (e.g., dimethyl carbonate or diethyl carbonate) through a heated flow reactor containing an alumina catalyst (e.g., neutral alumina or basic alumina, optionally in the presence of up to about 10 wt % (e.g., 2 wt %, 3 wt %, 4 wt % or 5 wt %) of a basic metal salt such as $Zn(OH)_2$, $Mg(OH)_2$, $K_3PO_4$, KOH, NaOH, $Ca(OH)_2$, and KF, at a temperature in the range of about 120° C. to about 160° C., and a pressure sufficient to maintain the dialkyl carbonate below its boiling point. In some embodiments the pressure in the reactor tube is greater than 1.5 bars (e.g., about 2 to 15 bars). Preferably, the residence time of the solution is about 0.5 to about 20 minutes (e.g., about 2 to about 10 minutes) within the reactor. After exiting the tubular reactor, the resulting effluent mixture is distilled to obtain the compound of Formula (II).

Preferably, the catalyst is a particulate alumina material packed in the reactor tube of a tubular flow reactor, and the reaction mixture is passed through catalyst in the heated tube at the specified temperature. In some embodiments, the molar excess of dialkyl carbonate:silyl alcohol preferably is about 2:1 to about 15:1, preferably about 3:1 to 10:1, more preferably about 4:1 to about 5:1. For example, a solution of trimethylsilylmethanol in a 4.3:1 molar excess (5:1 weight ratio) of dimethyl carbonate is passed through a heated tube reactor packed with a basic alumina catalyst to form methyl trimethylsilylmethyl carbonate (MTMSMC), with methanol as a byproduct, as shown below:

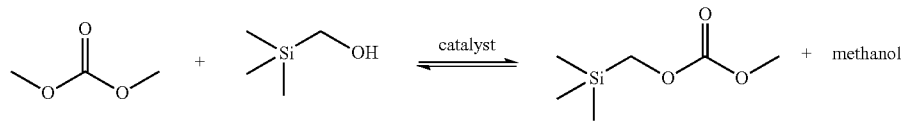

wherein the tube reactor is heated a temperature of about 140 to 150° C. and the residence time of the solution is about 0.5 to about 20 minutes at a pressure of about 2 to 15 bars.

As used herein, the term "alkyl" and grammatical variations thereof refers to a univalent saturated hydrocarbon group, i.e., saturated hydrocarbon lacking one hydrogen atom, e.g. methyl, ethyl, propyl, isopropyl, butyl, 1-methyl-1-propyl (also known as sec-butyl), 2-methyl-1-propyl (also known as isobutyl), pentyl, hexyl, cyclopenyl, cyclohexyl, and the like. Alkyl groups can include linear chains of carbons atoms (linear alkyl), branched chains of carbon atoms (branched alkyl), rings of carbon atoms (e.g., cycloalkyl), or any combination thereof. In some embodiments of the compounds of Formula (I) and (II) an alkyl group can comprise 1 to 6 carbon atoms (also referred to as "$C_1$ to $C_6$ alkyl"), such as methyl, ethyl, propyl, and the like. In some embodiments, preferred alkyl groups include methyl and ethyl.

As used herein the term "alkylene" refers to a bivalent saturated aliphatic radical (e.g., such as ethylene (—$CH_2CH_2$—), propylene (—$CH_2CH_2CH_2$—), and the like), which is formally regarded as derived from an alkene by opening of the double bond or from an alkane by removal of two hydrogen atoms from different carbon atoms. Polyoxyalkylene groups (also known as polyalkylene glycol groups) include two or more alkylene groups bound together by oxygen atoms in a chain, such as a polyethylene oxide group: —$[O$—$CH_2CH_2]_x$—, where x is greater than 1. In some embodiments of the compounds of Formula (I) and (II) an alkylene group can comprise 1 to 6 carbon atoms (also referred to as "$C_1$ to $C_6$ alkylene"), such as methylene (—$CH_2$—), ethylene (—$CH_2CH_2$—), linear propylene (e.g., —$CH_2CH_2CH_2$—), branched propylene (e.g., —$CH_2(CH_3)CH_2$—), and the like. In some embodiments of Formula (I), $R^5$ is $C_2$ to $C_3$ alkylene. In some embodiments $X^2$ and/or $X^3$ is $C_1$ to $C_3$ alkylene.

Non-limiting examples of lithium salts useful in the electrolyte compositions described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro (oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LiFSI), lithium bis(pentafluoroethyl sulfonyl)imidate (LiBETI), lithium tetracyanoborate (LiB(CN)$_4$), lithium nitrate, combinations of two or more thereof, and the like. In some preferred embodiments, the lithium salt comprises lithium nitrate in combination with at least one other salt, e.g., LiTFSI. Preferably, the lithium salt is selected from one or more of LiF$_2$BC$_2$O$_4$, LiPF$_6$, LiBF$_4$, LiB(C$_2$O$_4$)$_2$, LiClO$_4$, lithium bis(fluorosulfonyl)imidate (LiFSI), lithium bis(trifluoromethanesulfonyl)imidate (LiTFSi), and LiAsF$_6$. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between an anode and a cathode, and includes so-called full cells with an anode material (e.g., graphite) that can accommodate intercalated lithium ions, as well as so-called half-cells in which the anode is lithium metal. In some embodiments, the lithium salt is present in the electrolyte at a concentration in the range of about 0.1 M to about 3 M, e.g., about 0.5 M to 2 M, or 1 M to 1.5M. A preferred lithium salt is LiPF$_6$.

The electrolytes described herein comprise an electrolyte salt dissolved in a non-aqueous solvent comprising a compound of Formula (I). Optionally, the solvent of the electrolyte also comprises one or more solvent selected from an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, a fluoro-substituted sulfone, and a compound of Formula (II). For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds. Preferably, the compound of Formula (I) comprises about 2% to about 100% of the solvent portion of the electrolyte on a weight basis (wt %), when the compound of Formula (I) is utilized for its ability to dissolve the electrolyte salt. When utilized as an additive e.g., to modify the solid electrolyte interface (SEI) layer, the compound of Formula (I) preferably is present at a concentration of about 0.05 wt % to about 2 wt % (more preferably about 0.1 to about 0.5 wt %).

The electrolyte compositions described herein also can optionally comprise an additive such as those described in Jow et al. (Eds.), *Electrolytes for Lithium and Lithium-ion Batteries*; Chapter 3, pp. 167-182; Springer; New York, N.Y. (2014), which is incorporated herein by reference in its entirety. Such additives can provide, e.g., benefits such as SEI, cathode protection, Li salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M.

The electrolytes can be incorporated in a lithium-ion electrochemical cell comprising a positive electrode (cathode), a negative electrode (anode), and a porous separator between the cathode and anode, with the electrolyte in contact with both the anode and cathode, as is well known in the battery art. A battery can be formed by electrically connecting two or more such electrochemical cells in series, parallel, or a combination of series and parallel. The electrolyte can be utilized with any anode or cathode compositions useful in lithium-ion batteries. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

Processes used for manufacturing lithium cells and batteries are well known in the art. The active electrode materials are coated on both sides of metal foil current collectors (typically copper for the anode and aluminum for the cathode) with suitable binders such as polyvinylidene difluoride and the like to aid in adhering the active materials to the current collectors. The anode active material typically is a carbon material such as graphite, and the cathode active material typically is a lithium metal oxide material. Cell assembly typically is carried out on automated equipment. The first stage in the assembly process is to sandwich a separator between the anode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed the cell must be subjected to at least one controlled charge/discharge cycle to activate the electrode materials and form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. *J. Electrochem. Soc.*, 2016; 163 (14): A2999-A3009, which is incorporated herein by reference in its entirety. This procedure involves a 1.5 V tap charge for 15 minutes at C/3 current limit, followed by a 6 hour rest period, and then 4 cycles at C/10 current limit, with a current cutoff (i≤0.05 C) at the top of each charge.

The solvents described herein can be utilized with any combination of anode and cathode in any type of rechargeable battery system that utilizes a non-aqueous electrolyte. The electrolytes described herein can be utilized in any rechargeable lithium battery system with a graphite or silicon-based anode and any lithium metal oxide cathode material or other cathode active material used in lithium-ion batteries. In some embodiments, the cathode can comprise a layered lithium metal oxide cathode material such as $LiMO_2$ wherein M=Mn, Ni, Co or a combination thereof (e.g., a layered lithium nickel-manganese-cobalt oxide such as $LiNi_{0.5}Mn_{0.3}Co_{0.2}O_2$ (also known as "NMC532"), and similar materials). In other embodiments, the cathode can comprise a spinel lithium metal oxide such as $Li_2M'_2O_4$ wherein M'=Mn, Ni, Co or a combination thereof; a structurally integrated 'layered-layered' (LL) lithium metal oxide such as $xLi_2MnO_3 \cdot (1-x)LiMn_yM_{1-y}O_2$ wherein $0<x<1$, $0 \leq y \leq 1$, M=Ni, Co, or Ni and Co; a structurally integrated 'layered-spinel' (LS) lithium metal oxide such as $xLi_2MnO_3 \cdot (1-x)Li_2Mn_yM_{2-y}O_4$ wherein $0<x<1$, $0 \leq y \leq 2$, M=Ni, Co, or Ni and Co; a structurally integrated 'layered-layered-spinel'(LLS) lithium metal oxide such as $z[xLi_2MnO_3Li_2Mn_yM_{2-y}O_4] \cdot (1-z)Li_2M'_2O_4$ wherein $0<x<1$, $0 \leq y \leq 1$, $0<z<1$, M=Ni, Co, or Ni and Co, and M'=Mn, Ni, Co or a combination thereof (e.g., $0.85[0.25Li_2MnO_3 \cdot (0.75)LiMn_{0.375}Ni_{0.375}Co_{0.25}O_2] \cdot 0.15Li_2M'_2O_4$ wherein M'=a combination Mn, Ni, and Co); or any other cathode active material used in lithium-ion batteries.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

The following non-limiting examples are provided to illustrate certain features of the compositions and methods described herein.

Example 1. Preparation of Compounds of Formula (I)

A. Bis-(trimethylsilyl)methyl Carbonate

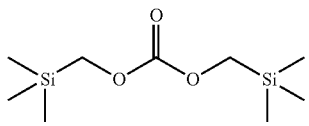

A 100 mL flask was charged with potassium phosphate (0.67 g), dimethyl carbonate (DMC, 7.5 g) and trimethylsilyl methanol (18.3 g). The mixture was stirred overnight under a nitrogen atmosphere. GC analysis showed little conversion, and the reaction was heated at about 80-85° C. for about 24 hours (h). The conversion was still low, so the mixture was then distilled at 60 Torr without removal of the catalyst. The distillation residue and fraction 4 were re-distilled to afford 13.2 g of the title product. Analysis: bp 216-218° C. (985 mbar). FTIR (matches structure). GC/MS: (High Mass Default), 50 µL/mL in ACN: RT: 7.881 min (0.57%), 9.454 min (99.426%). Flash point: 83.5° C. $^1$H NMR (CDCl$_3$, 500 MHz) δ 3.81 (s, 2H, CH$_2$), 0.063 (s, 9H, TMS). $^{13}$C NMR (CDCl$_3$, 125 MHz) δ 157.96, 61.78, −3.21.

B. Ethane-1,2-diyl bis((trimethylsilyl)methyl) Bis(carbonate)

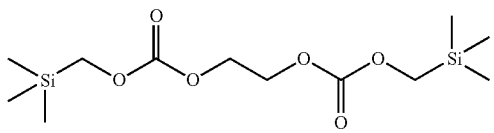

Toluene (150 mL) was added to a 500 mL flask, followed by carbonyl diimidazole (CDI, 23.51 g) with mixing. A pellet of KOH was added to the mixture, which was then heated to 65° C. To this suspension was added a solution of trimethylsilyl methanol (TMSM; 10.00 g) in toluene (about 10 mL) over about one hour. The suspension gradually cleared. After the addition was complete, the mixture was stirred at 65° C. for about 4 hours and then heating was stopped and the mixture was allowed to cool to room temperature. The room temperature suspension was filtered and washed with 30 mL fresh toluene. A pellet of KOH was added to the filtrate, which was then heated to about 65° C., and ethylene glycol (2.55 g) was added over about 1 hour, followed by heating at 65° C. for about 6 hours. After cooling, the room temperature mixture was filtered and rotary evaporated to an oil. The oil was chromatographed on silica (100 g cartridge) eluting with 10% ethyl acetate/hexane to yield 2.98 g of desired product. Analysis: bp 260-262° C. (969 mbar). FTIR (matches structure). GC: 98.4%. GC/MS: (High Mass Default), 50 µL/mL in ACN: RT: 13.285 min (98.419%). $^1$HNMR (CDCl$_3$, 500 MHz) δ 4.32 (s, 2H, CH$_2$), 3.83 (s, 2H, CH$_2$), 0.073 (s, 9H, TMS). $^{13}$C NMR (CDCl$_3$, 125 MHz) δ 156.35, 65.39, 62.12, −3.26.

C. Oxybis(ethane-2,1-diyl) bis((trimethylsilyl)methyl) Bis(carbonate)

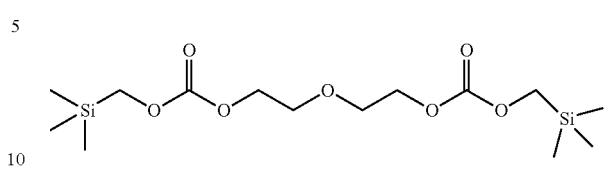

Toluene (150 mL) was added to a 250 mL flask, followed by CDI (23.71 g) with stirring. A pellet of KOH was added and the mixture was heated to 65° C. To the resulting suspension was added a solution of trimethylsilyl methanol (9.94 g) in toluene (about 10 mL) over about one hour. The suspension gradually cleared. After the addition was complete, the mixture was stirred at 65° C. for about 4 hours and then cooled to room temperature. The room temperature suspension was filtered and washed with 30 mL fresh toluene. A pellet of KOH was then added to the filtrate, the mixture was heated to 65° C., and diethylene glycol (4.39 g) was added at a rate of about 0.7 mL/h. After the addition was complete, the mixture was heated for about 6 h at 65° C., and then cooled. The room temperature mixture was filtered and rotary evaporated to an oil. The oil was chromatographed on silica (100 g cartridge) eluting with 10% ethyl acetate/hexane to yield 5.0905 g of desired product. Analysis: bp 273-275° C. (969 mbar). FTIR (matches structure). GC: 99.7%. GC/MS: (High Mass Default), 50 µL/mL in ACN: RT: 14.470 min (99.723%). $^1$H NMR (CDCl$_3$, 500 MHz) δ 4.25-4.22 (m, 2H, CH$_2$), 3.80 (s, 2H), 3.70-3.67 (m, 2H, CH$_2$), 0.052 (s, 9H, TMS). $^{13}$C NMR (CDCl$_3$, 125 MHz) δ 156.55, 68.96, 66.80, 61.87, −3.24.

D. (Dimethyl((trimethylsilyl)methyl)silyl)methyl Methyl Carbonate

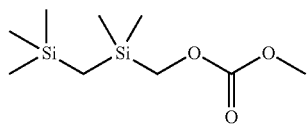

A 250 mL flask was charged with potassium phosphate (2.8059 g), dimethyl carbonate (110 mL), and (1,1,3,3,3-pentamethyldisiloxaneyl)methanol (20.24 g). The mixture was heated to 88° C. with stirring for about 10 h under a nitrogen purge, with the outlet vapors sent to a trap, and then to a bubbler. The mixture was cooled, filtered, and distilled through a 20 cm Vigreaux column. The fraction boiling at about 95-105° C. at 20 Torr was isolated to yield 21.34 g of desired product. Analysis: bp 226-227° C. (976 mbar). FTIR (matches structure). GC/MS: (High Mass Default), 50 µL/mL in ACN: RT: 8.427 min (0.372%), 10.850 min (99.628%, m/z=234). Flash point: 87.6° C. $^1$H NMR (CDCl$_3$, 500 MHz) δ 3.78 (s, 2H, OCH$_2$), 3.80 (s, 2H), 3.74 (s, 3H, OCH$_3$), 0.080 (s, 6H, SiMe$_2$), 0.01 (s, 9H, TMS), −0.21 (s, Si—CH$_2$—Si). $^{13}$C NMR (CDCl$_3$, 125 MHz) δ 157.21, 62.51, 54.76, 1.22, 0.82, −2.24.

E. Bis((dimethyl((trimethylsilyl)methyl)silyl)methyl) Carbonate

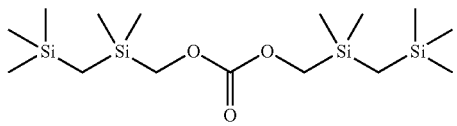

A 100 mL flask was charged with potassium phosphate (2.6 g), dimethyl carbonate (7.64 g), and (1,1,3,3,3-pentamethyldisiloxaneyl)methanol (14.72 g). The mixture was heated to about 88° C. with stirring overnight under a nitrogen purge, with the outlet vapors sent to a trap, and then to a bubbler. The mixture was distilled through a 20 cm Vigreaux column and the fraction boiling at 110-140° C. at about 4.4 Torr was isolated to yield 10.34 g of desired product. Initial fractions contained some mono-methyl carbonate. Analysis: bp 276-277° C. (976 mbar). FTIR (matches structure). GC/MS: (High Mass Default), 50 µL/mL in ACN: RT: 9.557 min (0.130%), 10.836 min (0.645%, mono-methyl) m 12.269 min (0.523%), 13.739 (98.701%, m/z=278). Flash point: 140.7° C. $^1$H NMR (CDCl$_3$, 500 MHz) δ 3.79 (s, 2H, OCH$_2$), 0.09 (s, 6H, SiMe$_2$), 0.02 (s, 9H, TMS), −0.20 (s, Si—CH$_2$—Si). $^{13}$C NMR (CDCl$_3$, 125 MHz) δ 158.08, 62.39, 1.26, 0.95, −2.11.

F. (Dimethyl((trimethylsilyl)methyl)silyl)methyl Ethyl Carbonate

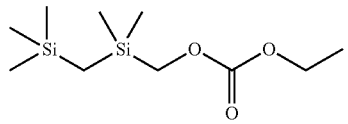

A 250 mL flask was charged with potassium phosphate (2.8938 g), diethyl carbonate (DEC, 110 mL) and (1,1,3,3,3-pentamethyldisiloxanyl)methanol (16.41 g). The mixture was heated at about 110° C. with stirring for 10 h under a nitrogen purge, with the outlet vapors sent to a trap, and then to a bubbler. The mixture was cooled, filtered, and rotary evaporated at about 13 mbar, 50° C. water bath to remove DEC. The residue was then distilled through a 20 cm Vigreaux column and the fraction boiling at about 94-95° C. at about 7 Torr was isolated to obtain 13.92 g of desired product. Analysis: bp 238-240° C. (976 mbar). FTIR (matches structure). GC/MS: (High Mass Default), 50 µL/mL in ACN: RT: 10.837 min (0.136%), 11.245 min (99.864%, m/z=248). Flash point: 97.5° C. $^1$H NMR (CDCl$_3$, 500 MHz) δ 4.15 (q, J=7 Hz, 2H), 3.77 (s, 2H, OCH$_2$), 1.27 (t, J=7 Hz, 3H), 0.080 (s, 6H, SiMe$_2$), 0.005 (s, 9H, TMS), −0.21 (s, Si—CH$_2$—Si). $^{13}$C NMR (CDCl$_3$, 125 MHz) δ 156.64, 63.89, 62.22, 14.32, 1.23, 0.84, −2.20.

G. (Dimethylsilanediyl)bis(methylene) Dimethyl Bis(carbonate)

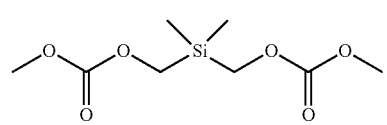

A 1000 mL flask was charged with potassium phosphate (2.67 g), dimethyl carbonate (80 mL) and bis(hydroxymethyl)dimethyl silane (16.6 g). The mixture was heated at about 88° C. overnight with stirring under a nitrogen atmosphere. The mixture was filtered and rotary evaporated to a clear oil. The mixture was then chromatographed on silica using an ethyl acetate/hexane gradient elution. The product-positive fractions were rotary evaporated and then placed on full vacuum to dry, yielding 21.27 g or desired product. Analysis: bp 252-254° C. (976 mbar). FTIR (matches structure). GC 99.8%. GC/MS: (High Mass Default), 50 µL/mL in ACN: RT: 11.528 min (99.82%), 12.237 min (0.176%). Flash point: 129.6° C. $^1$H NMR (CDCl$_3$, 500 MHz) δ 3.90 (s, 2H, CH$_2$), 3.72 (s, 2H, CH$_2$), 0.147 (s, 6H, SiMe$_2$). $^{13}$C NMR (CDCl$_3$, 125 MHz) δ 156.91, 59.10, 54.91, −6.35.

Example 2. Preparation of Compounds of Formula (II)

A. Methyl ((trimethylsilyl)methyl) Carbonate—Batch Method

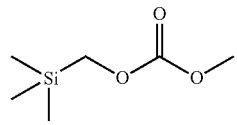

A 500 mL flask was charged with potassium carbonate (1.01 g), dimethyl carbonate (250 mL), and trimethylsilyl methanol (TMS-CH$_2$OH, also referred to as TMSM, 70.86 g). The mixture was heated to 87° C. with stirring under a nitrogen purge. After 2 hours (h), significant TMSM was still present by GC measurement. The mixture was heated overnight, for a total heating time of about 22 h. This resulted in a cloudy colorless solution, i.e. K$_2$CO$_3$ was visible.

The suspension was filtered through a CELITE diatomaceous earth pad, and the mixture was then distilled through a 5 plate Oldershaw column, at a pressure of 100 Torr. The fractions were analyzed by GC/FID, and fractions 4-5 were combined to provide 75 g (68% yield) of pure (>99%) methyl ((trimethylsilyl)methyl) carbonate. Analysis: bp 161-162° C. (985 mbar). FTIR (matches structure). GC/FID: 30° C. for 6 min, ramp to 300° C., 50° C./min) neat injection: RT: 6.055 min (0.73%), 7.083 min (99.18%); 10% in ACN injection: RT: 6.054 min (0.71%); RT 6.894 min (99.21%). GC/MS: (High Mass Default), 50 µL/mL in ACN: RT: 7.431 (1.279%, m/z=NA), RT: 8.468 (98.65%, m/z=162), RT: 10.538 (0.07%, m/z=NA). Flash point: 48.4° C. $^1$H NMR (CDCl$_3$, 500 MHz) δ 3.80 (s, 2H, CH$_2$), 3.75 (s, 3H, OCH$_3$), 0.05 (s, 9H, TMS). $^{13}$C NMR (CDCl$_3$, 125 MHz) δ 157.19, 61.86, 54.81, −3.28.

B. Ethyl (trimethylsilyl)methyl) Carbonate—Batch Method

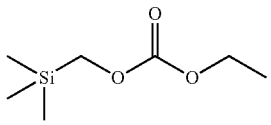

A mixture of diethyl carbonate (DEC, 154 g) and trimethylsilyl methanol (32.27 g) was treated with potassium phosphate (2.1 g). The mixture was heated to 120° C. for about 10 h. By GC analysis, the reaction was complete. The suspension was filtered to remove $K_3PO_4$, then the filtrate was stirred over AMBERLYST-15 ion exchange resin for about 2 hours. The resin was removed by filtration and the solution was distilled at about 100 Torr to remove DEC, then at about 50 Torr to distill the product. Fraction 4 was 99.8% pure by GC, yielding 24 g. Analysis: bp 174-176° C. (976 mbar). FTIR (matches structure). GC/MS: (High Mass Default), 50 μL/mL in ACN: RT: 6.313 min (0.02%), 8.401 min (99.824%), 9.437 min (0.157%). Flash point: 57.5° C. $^1$H NMR (CDCl$_3$, 500 MHz) δ 4.13 (q, 2H, CH$_2$), 3.78 (s, 2H, CH$_2$—Si), 1.25 (t, 3H, CH$_3$), 0.045 (s, 9H, TMS). $^{13}$C NMR (CDCl$_3$, 125 MHz) δ 156.56, 63.87, 61.49, 14.28, −3.30.

C. Methyl ((trimethylsilyl)methyl) Carbonate—Flow Synthesis

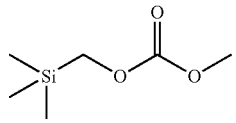

A high-temperature flow cell (6.6 mm diameter, 100 mm length) was packed with basic alumina (1.6 g, aluminum oxide, basic, Brockman 1, 50-200 m particle size) and attached to a SYRRIS flow system. A solution of trimethylsilyl methanol (66.96 g) in dimethyl carbonate (349.39 g) was prepared and pumped through the heated tubular reactor system at 150° C. at a rate of 250 μL/min at an elevated pressure above ambient atmospheric pressure. After about 17 hours reaction time, approximately 250 mL of effluent from the reactor had collected. The collected eluent was determined to have undergone approximately 92% conversion (by GC) to the desired product. This was then vacuum distilled to give methyl ((trimethylsilyl)methyl) carbonate (37.71 g, 60% yield based on eluted material) in fraction 4, with a GC/MS purity of 99.45%.

Figure 2:
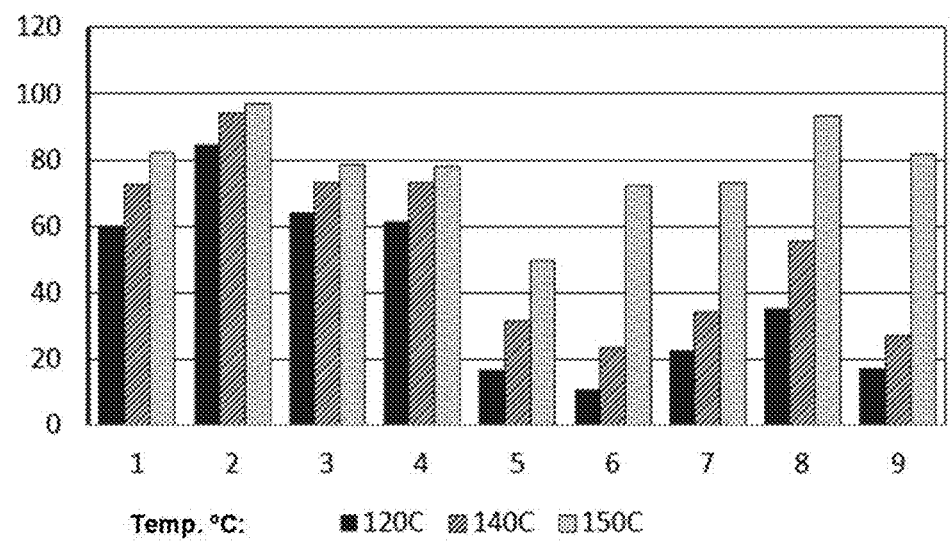
FIG. 2 shows plots of % conversion (vertical axis) at two-minutes residence time in a flow reactor for reaction of a respective 1:5 weight ratio of trimethylsilymethanol (TMSM) in dimethyl carbonate (DMC) to form methyl trimethylsilylmethyl carbonate (MTMSMC) at three temperatures (120° C., 140° C. and 150° C.) in the presence of the following catalysts (horizontal axis): (1) alumina with 10 wt % Zn(OH)$_2$, (2) basic alumina, (3) alumina with 10 wt % Mg(OH)$_2$, (4) neutral alumina, (5) alumina with 5 wt % K$_3$PO$_4$, (6) alumina with 5 wt % KOH, (7) alumina with 5 wt % NaOH, (8) alumina with 5 wt % Ca(OH)$_2$, and (9) alumina with 5 wt % KF.

Various other reaction conditions and catalysts were explored for the synthesis of MTMSMC and related compounds of Formula (II) in addition to those described above. FIG. 2 shows plots of % Conversion (vertical axis) at 2 minutes residence time in a flow reactor for reaction of a respective 1:5 weight ratio (1:4.3 molar ratio) of trimethylsilylmethanol (TMSM) in dimethyl carbonate (DMC) to form methyl trimethylsilylmethyl carbonate (MTMSMC) at three temperatures (120° C., 140° C. and 150° C.) in the presence of the following catalysts (horizontal axis): (1) alumina with 10 wt % Zn(OH)$_2$, (2) basic alumina, (3) alumina with 10 wt % Mg(OH)$_2$, (4) neutral alumina, (5) alumina with 5 wt % K$_3$PO$_4$, (6) alumina with 5 wt % KOH, (7) alumina with 5 wt % NaOH, (8) alumina with 5 wt % Ca(OH)$_2$, and (9) alumina with 5 wt % KF. Basic alumina appears to be the best catalyst from those evaluated.

Figure 3:
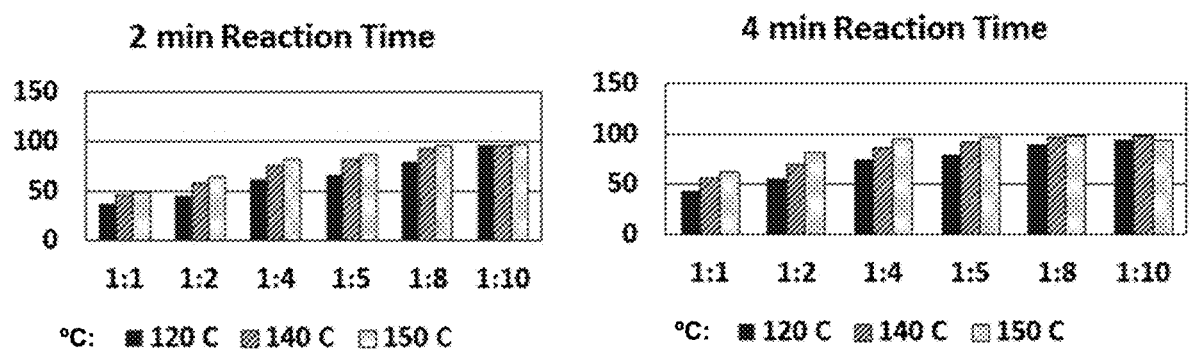
FIG. 3 shows plots of % conversion (vertical axes) at two-minutes (left) and four-minutes (right) residence time in a flow reactor for reaction of TMSM and DMC and to form MTMSMC at three temperatures (120° C., 140° C. and 150° C.) in respective weight ratios of TMSM:DMC ranging from 1:1 to 1:10 (horizontal axes), in the presence of a basic alumina catalyst.

FIG. 3 shows plots of % Conversion (vertical axes) at 2 minutes (left) and 4 minutes (right) residence time in the SYRRIS flow reactor for reaction of TMSM and DMC and to form MTMSMC at three temperatures (120° C., 140° C. and 150° C.) in respective weight ratios of TMSM:DMC ranging from 1:1 to 1:10 (horizontal axes), in the presence of basic alumina catalyst. The best conditions for this system appears to be a weight ratio of TMSM:DMC of about 1:5 (1:4.3 molar ratio) at about 150° C.

Figure 4:
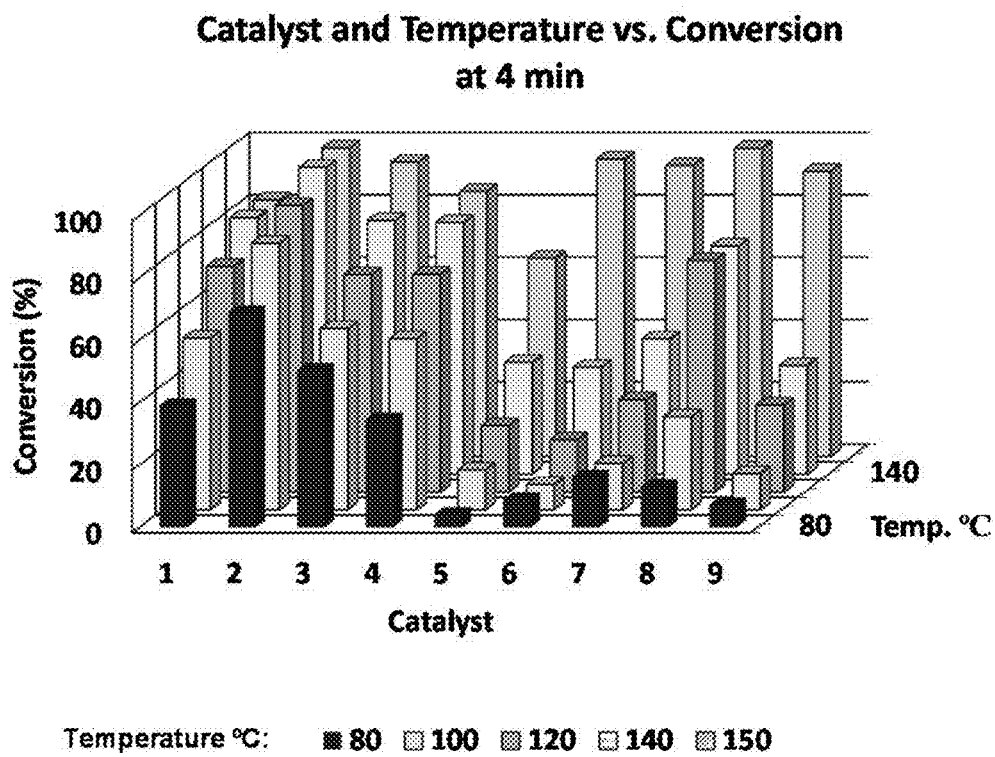
FIG. 4 shows plots of % conversion at four-minutes residence time in a flow reactor for reaction of TMSM with DMC in a respective weight ratio of 1:5 to form MTMSMC at five temperatures (80° C., 100° C., 120° C., 140° C. and 150° C.) in the presence of the following catalysts: (1) alumina with 10 wt % $Zn(OH)_2$, (2) basic alumina, (3) alumina with 10 wt % $Mg(OH)_2$, (4) neutral alumina, (5) alumina with 5 wt % $K_3PO_4$, (6) alumina with 5 wt % KOH, (7) alumina with 5 wt % NaOH, (8) alumina with 5 wt % $Ca(OH)_2$, and (9) alumina with 5 wt % KF.

FIG. 4 shows plots of % Conversion at 4 minutes residence time in the SYRRIS flow reactor for reaction of TMSM with DMC in a respective weight ratio of 1:5 to form MTMSMC at five temperatures (80° C., 100° C., 120° C., 140° C. and 150° C.) in the presence of the following catalysts: (1) alumina with 10 wt % Zn(OH)$_2$, (2) basic alumina, (3) alumina with 10 wt % Mg(OH)$_2$, (4) neutral alumina, (5) alumina with 5 wt % K$_3$PO$_4$, (6) alumina with 5 wt % KOH, (7) alumina with 5 wt % NaOH, (8) alumina with 5 wt % Ca(OH)$_2$, and (9) alumina with 5 wt % KF. The best conditions appeared to be basic alumina at about 150° C.

Similar results were obtained for the preparation of ethyl ((trimethylsilyl)methyl) carbonate (ETMSMC) from diethyl carbonate (DEC) and TMSM.

Figure 5:
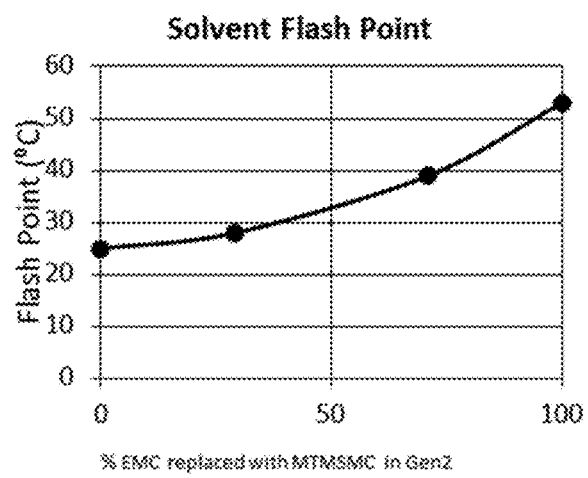
FIG. 5 shows a plot of solvent flash point (° C.) versus the percent of MTMSMC replacing EMC in Gen2 solvent (a 3:7 weight ratio of ethylene carbonate (EC) to ethyl methyl carbonate (EMC)).

When added to a conventional carbonate based electrolyte solvent (e.g., Gen2), MTMSMC increases the flash point and viscosity of the solvent. FIG. 5 shows a plot of solvent flash point (° C.) versus the percent of MTMSMC replacing EMC in Gen2 solvent (3:7 weight ratio of EC:EMC). As can be seen in FIG. 5, the flash point increases with increasing amounts of MTMSMC in the solvent. The highest flash point was obtained with 100% of the EMC replaced by MTMSMC.

Figure 6:
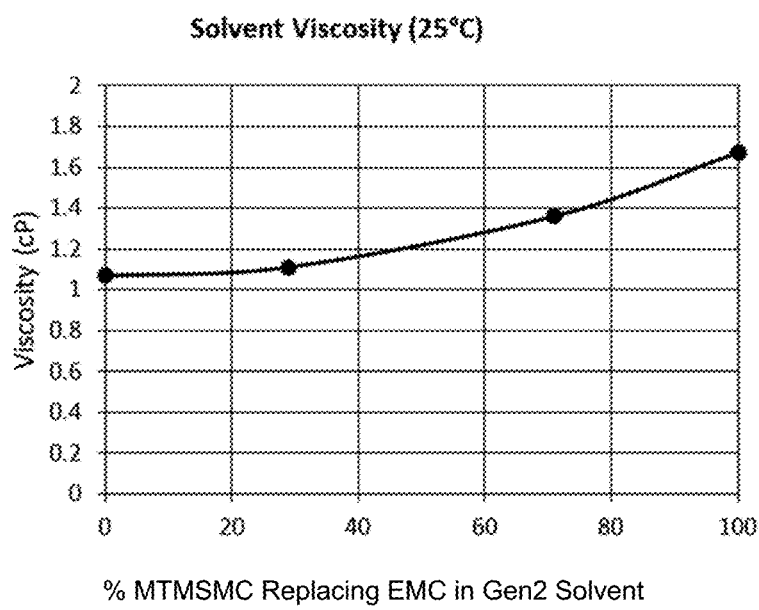
FIG. 6 shows a plot of solvent viscosity (in centipoise; cP) versus the percent of MTMSMC replacing EMC in Gen2 solvent.

FIG. 6 shows a plot of solvent viscosity (in centipoise; cP) versus the percent of MTMSMC replacing EMC in Gen2 solvent. As can be seen in FIG. 6, the solvent viscosity increases with increasing amounts of MTMSMC in the solvent. The highest viscosity was obtained with 100% of the EMC replaced by MTMSMC.

Example 3. Electrochemical Evaluation of Compounds of Formulas (I) and (II)

Figure 7:
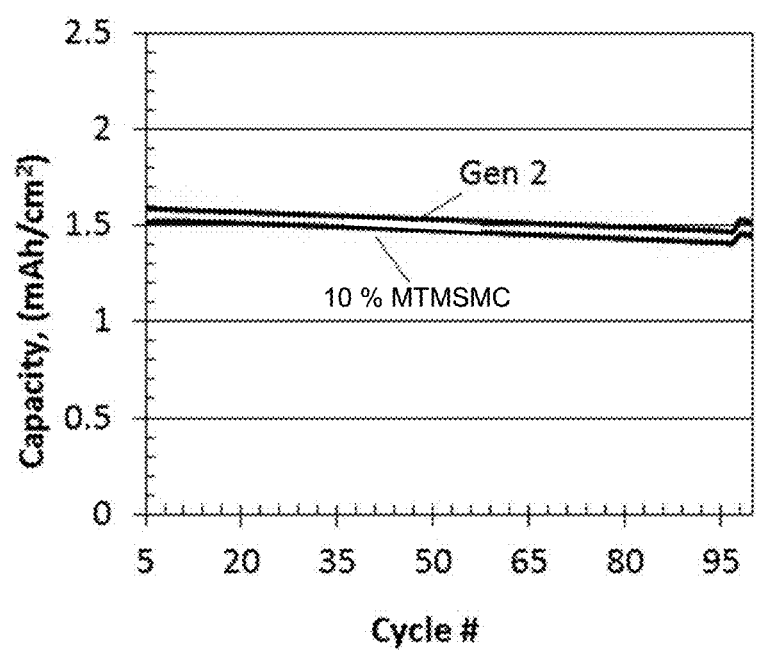
FIG. 7 shows plots of capacity ($mAh/cm^2$) versus cycle number for Graphite/NCM523 coin cells cycled between 3.0 and 4.4 V (C/3 rate) at 30° C. with electrolytes comprising 1.0 M $LiPF_6$ in either Gen2 solvent, or a solvent comprising 10 wt % MTMSMC in Gen2 solvent.

Coin cells comprising a graphite anode and an NMC532 cathode (Graphite/NMC532) with an electrolyte comprising 1.0 M LiPF$_6$ dissolved in a solvent comprising either Gen2 solvent, or 10 wt % MTMSMC in Gen2 solvent (i.e., a weight ratio of about 10:27:63 MTMSMC:EC:EMC), were cycled between 3.0 and 4.4 V at a C/3 rate at 30° C. FIG. 7 shows plots of capacity (mAh/cm$^2$) versus cycle number and shows that the cells with MTMSMC performed substantially the same as cells with Gen2 solvent.

Figure 8:
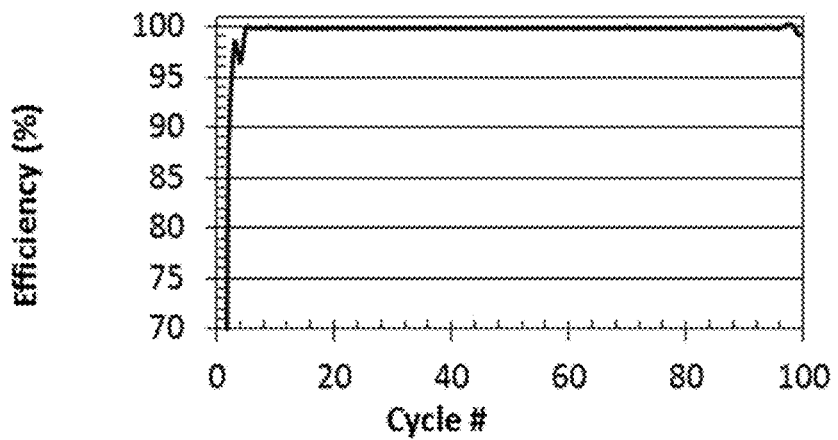
FIG. 8 shows a plot of coulombic efficiency versus cycle number for a Graphite/NCM523 coin cell cycled between 3.0 and 4.4 V at 30° C. (C/3 rate) with an electrolyte comprising 1.0M $LiPF_6$ in a solvent comprising 10 wt % MTMSMC in Gen2 solvent.

FIG. 8 shows a plot of coulombic efficiency versus cycle number for a Graphite/NMC532 coin cell cycled between 3.0 and 4.4 V at 30° C. (C/3 rate) with an electrolyte comprising 1.0 M LiPF$_6$ in a solvent comprising 10 wt % MTMSMC in Gen2 solvent (i.e., a weight ratio of about 10:27:63 MTMSMC:EC:EMC). The data in FIG. 8 demonstrate that the coulombic efficiency was substantially close to 100% over the entire series of cycles.

Figure 9:
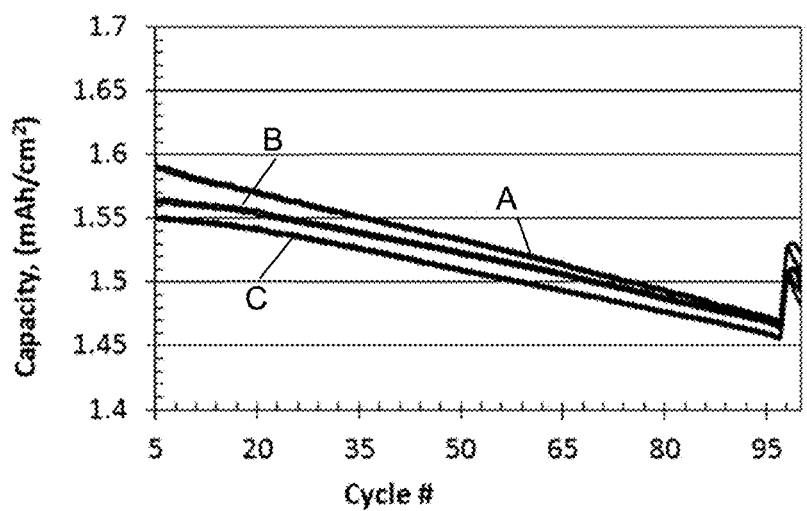
FIG. 9 shows capacity versus cycle number plots for Graphite/NCM523 coin cells cycled between 3.0-4.4 V (C/3) at 30° C. in an electrolyte comprising 1.0 M $LiPF_6$ in (A) Gen2 solvent; (B) a solvent comprising 10 wt % (dimethyl((trimethylsilyl)methyl)silyl)methyl methyl carbonate (TMSMSM-MC) in Gen2 solvent; and (C) a solvent comprising 10 wt % (dimethyl((trimethylsilyl)methyl)silyl) methyl ethyl carbonate (TMSMSM-EC) in Gen2 solvent.

FIG. 9 shows capacity (mAh/cm$^2$) versus cycle number plots for Graphite/NCM523 coin cells cycled between 3.0-4.4 V (C/3) at 30° C. in an electrolyte comprising 1.0M LiPF$_6$ in a solvent selected from: (Plot A) Gen2 solvent; Plot (B) 10 wt % (dimethyl((trimethylsilyl)methyl)silyl)methyl methyl carbonate (TMSMSM-MC) in Gen2 solvent (i.e., a weight ratio of about 10:27:63 TMSMSM-MC:EC:EMC); and Plot (C) 10% (dimethyl((trimethylsilyl)methyl)silyl) methyl ethyl carbonate (TMSMSM-EC) in Gen2 solvent (i.e., a weight ratio of about 10:27:63 TMSMSM-MC:EC:EMC). The results in FIG. 9 show that the capacities for coin cells utilizing the silylated solvents surprisingly differed from the Gen2 cells by less than 0.05 mAh/cm$^2$ over the entire 95 cycles evaluated.

Figure 10:
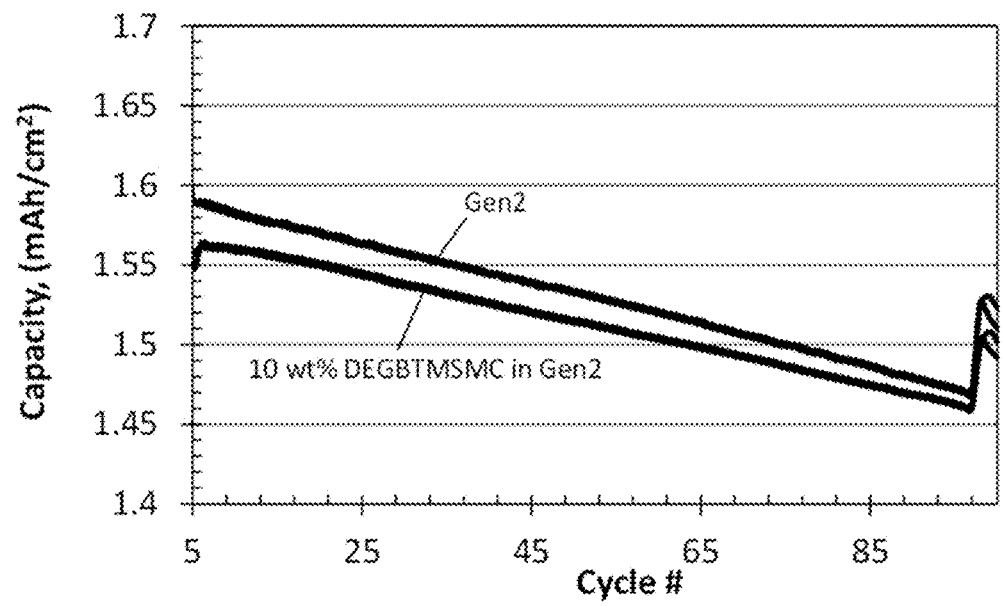
FIG. 10 provides plots of capacity versus cycle number for Graphite/NCM523 coin cells cycled between 3.0-4.4 V (C/3) at 30° C. in an electrolyte comprising 1.0 M $LiPF_6$ in Gen2 solvent, and in a solvent comprising 10 wt % DEG-BTMS-MC in Gen2 solvent.
Figure 11:
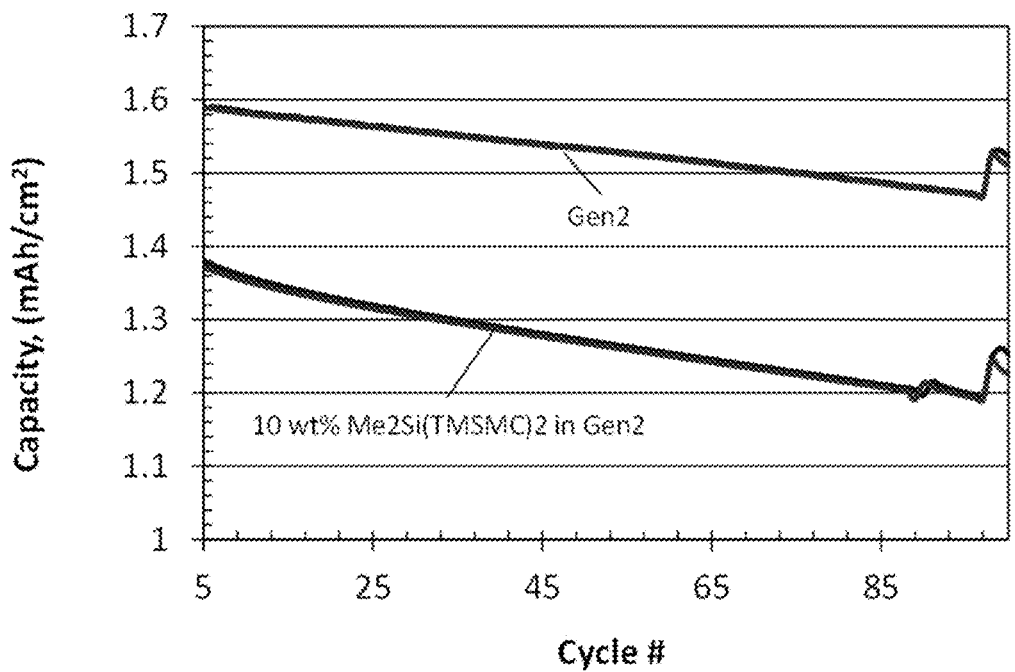
FIG. 11 provides plots of capacity versus cycle number for Graphite/NCM523 coin cells cycled between 3.0-4.4 V (C/3) at 30° C. in an electrolyte comprising 1.0 M $LiPF_6$ in Gen2 solvent, and in a solvent comprising 10 wt % Me2Si (TMSMC)2 in Gen2 solvent.
Figure 12:
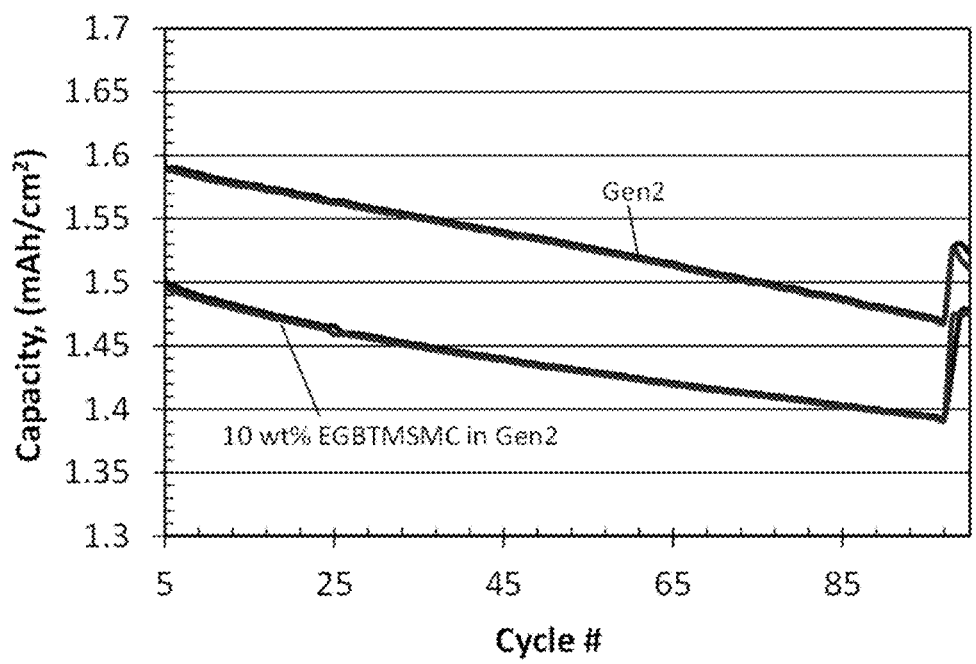
FIG. 12 provides plots of capacity versus cycle number for Graphite/NCM523 coin cells cycled between 3.0-4.4 V (C/3) at 30° C. in an electrolyte comprising 1.0 M $LiPF_6$ in Gen2 solvent, and in a solvent comprising 10 wt % EGBT-MSMC in Gen2 solvent.
Figure 13:
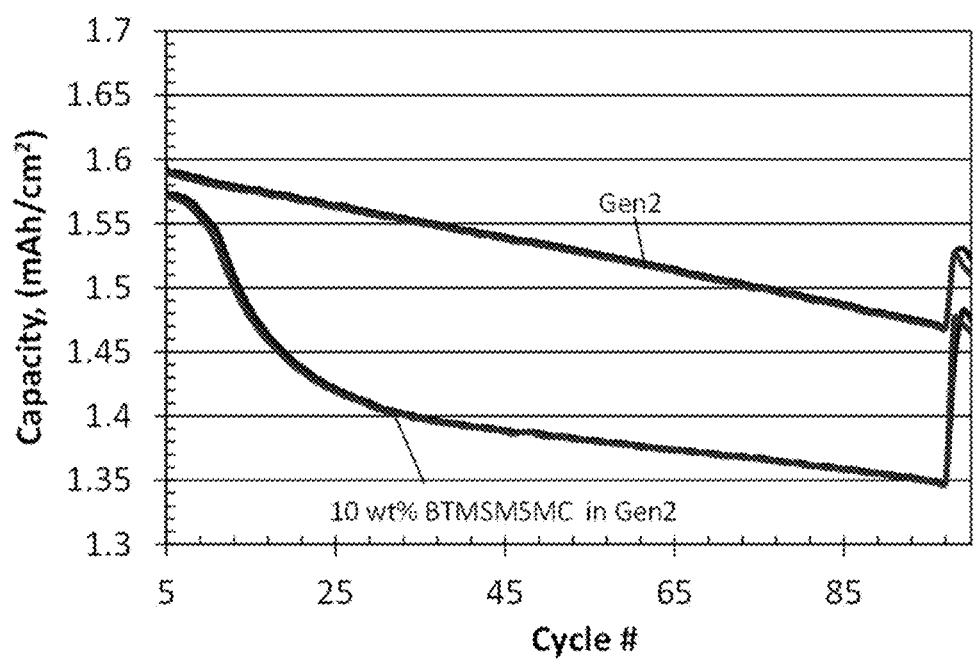
FIG. 13 provides plots of capacity versus cycle number for Graphite/NCM523 coin cells cycled between 3.0-4.4 V (C/3) at 30° C. in an electrolyte comprising 1.0 M $LiPF_6$ in Gen2 solvent, and in a solvent comprising 10 wt % BTMSMSMC in Gen2 solvent.
Figure 14:
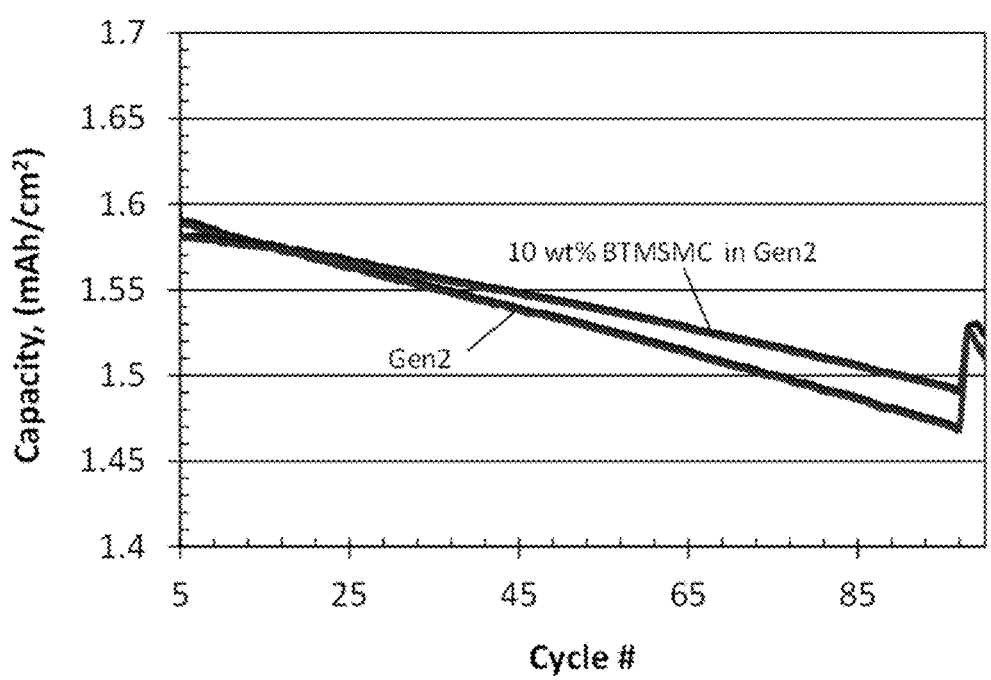
FIG. 14 provides plots of capacity versus cycle number for Graphite/NCM523 coin cells cycled between 3.0-4.4 V (C/3) at 30° C. in an electrolyte comprising 1.0 M $LiPF_6$ in Gen2 solvent, and in a solvent comprising 10 wt % BTMSMC in Gen2 solvent.

In addition, several other compounds of Formula (I) were evaluated, e.g., oxybis(ethane-2,1 diyl) bis((trimethylsilyl)methyl dicarbonate (DEGBTMSMC); (dimethylsilanediyl)bis(methylene(dimethyl dicarbonate (Me2Si(TMSMC)2); ethane-1,2-diyl bis((trimethylsilyl)methyl) dicarbonate (EGBTMSMC); bis((dimethyl((trimethylsilyl)methyl)silyl)methyl) carbonate (BTMSMSMC); and bis(trimethylsilyl)methyl carbonate (BTMSMC):

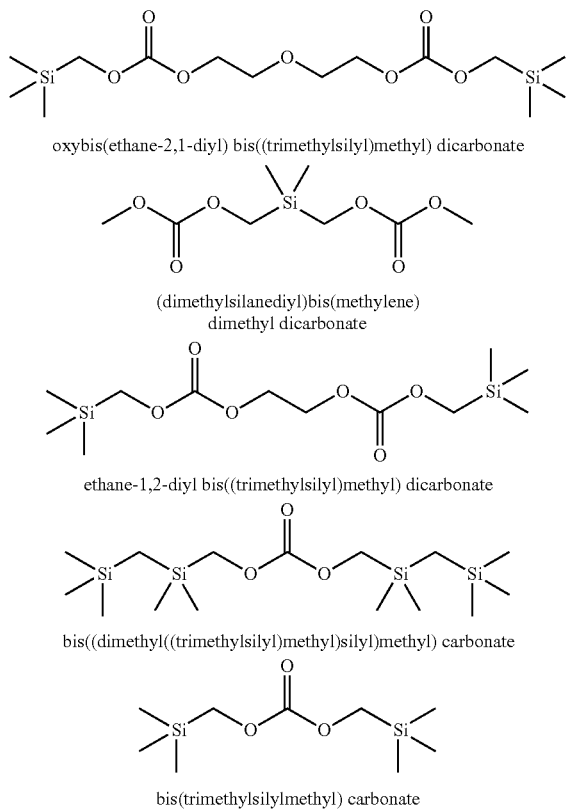

oxybis(ethane-2,1-diyl) bis((trimethylsilyl)methyl) dicarbonate (dimethylsilanediyl)bis(methylene) dimethyl dicarbonate ethane-1,2-diyl bis((trimethylsilyl)methyl) dicarbonate bis((dimethyl((trimethylsilyl)methyl)silyl)methyl) carbonate bis(trimethylsilylmethyl) carbonate The compounds were evaluated as a 10 wt % solution of each compound in Gen2 solvent in the same manner as described above for MTMSMC. FIG. 10 provides plots of capacity versus cycle number for Graphite/NCM523 coin cells cycled between 3.0-4.4 V (C/3) at 30° C. with 1.0 M $LiPF_6$ in Gen2 solvent, and in a solvent comprising 10 wt % DEGBTMSMC in Gen2 solvent. FIG. 11 provides plots of capacity versus cycle number for Graphite/NCM523 coin cells cycled between 3.0-4.4 V (C/3) at 30° C. with 1.0 M $LiPF_6$ in Gen2 solvent, and in a solvent comprising 10 wt % Me2Si(TMSMC)2 in Gen2 solvent. FIG. 12 provides plots of capacity versus cycle number for Graphite/NCM523 coin cells cycled between 3.0-4.4 V (C/3) at 30° C. with 1.0 M $LiPF_6$ in Gen2 solvent, and in a solvent comprising 10 wt % EGBTMSMC in Gen2 solvent. FIG. 13 provides plots of capacity versus cycle number for Graphite/NCM523 coin cells cycled between 3.0-4.4 V (C/3) at 30° C. with 1.0 M $LiPF_6$ in Gen2 solvent, and in a solvent comprising 10 wt % BTMSMSMC in Gen2 solvent. FIG. 14 provides plots of capacity versus cycle number for Graphite/NCM523 coin cells cycled between 3.0-4.4 V (C/3) at 30° C. with 1.0 M $LiPF_6$ in Gen2 solvent, and in a solvent comprising 10 wt % BTMSMC in Gen2 solvent.

As can be seen in the data in FIG. 10 and FIG. 14, electrolytes comprising 10 wt % of the indicated compounds of Formula (I) in Gen2 solvent preformed comparably to electrolytes comprising Gen2 solvent without the compound of Formula (I). The data in FIG. 11, FIG. 12, and FIG. 13 indicate that electrolytes comprising the indicated compounds of Formula (I) performed similarly, although with slightly lower capacity (e.g., about 0.1 to about 0.2 mAh/$cm^2$ lower), than Gen2 electrolyte without the compound of Formula (I).

Example 4. Exemplary Electrochemical Cell and Battery

Figure 15:
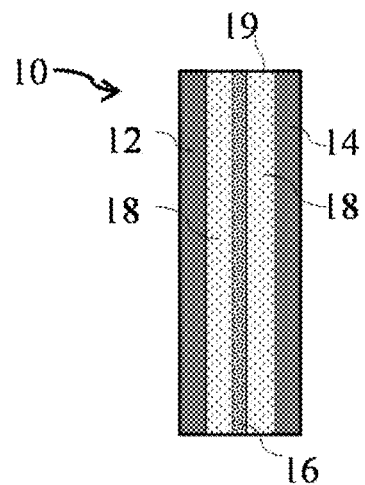
FIG. 15 depicts a schematic representation of an electrochemical cell.
Figure 16:
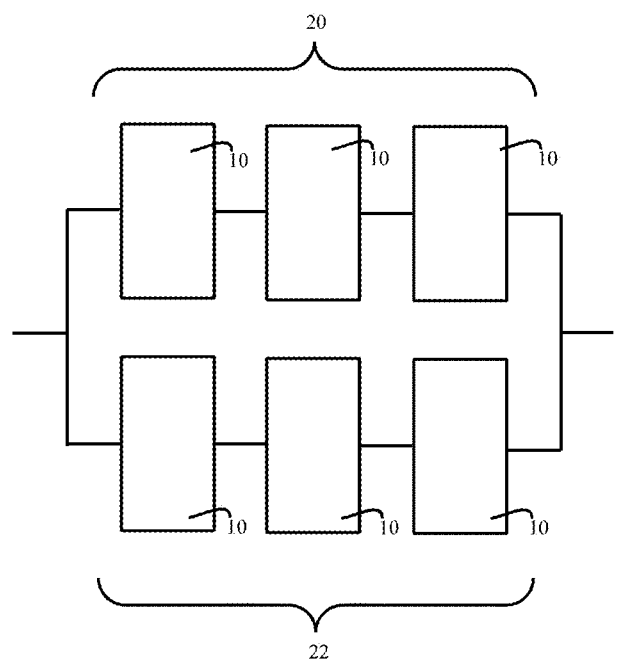
FIG. 16 depicts a schematic representation of a battery consisting of a plurality of cells connected electrically in series and in parallel.

FIG. 15 schematically illustrates a cross-sectional view of lithium-ion electrochemical cell 10 comprising cathode 12, and anode 14, with porous separator membrane 16 therebetween. Electrolyte 18, comprising a solution of a lithium salt in a non-aqueous solvent comprising the compound of Formula (I), contacts electrodes 12 and 14 and separator 16. The electrodes, separator and electrolyte are sealed within housing 19. FIG. 16 schematically illustrates a lithium-ion battery comprising a first cell bank 20 consisting of three series-connected electrochemical cells 10, and a second cell bank 22 consisting of three series-connected electrochemical cells 10, in which first bank 20 is electrically connected to second bank 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A solvent compound of Formula (I):

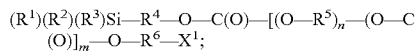

$(R^1)(R^2)(R^3)Si-R^4-O-C(O)-[(O-R^5)_n-(O-C(O)]_m-O-R^6-X^1$;

wherein:
each $R^1$ and $R^2$ independently is alkyl;
$R^3$ is alkyl, $-X^2-Si(R^7)(R^8)(R^9)$, or $-CH_2-O-C(O)-O-R^{10}$;
each $R^7$, $R^8$, $R^9$, and $R^{10}$ independently is alkyl;
each $R^4$ and $R^6$ independently is alkylene;
$R^5$ is $C_2$ to $C_6$ alkylene;
$X^1$ is H or $-Si(R^{11})(R^{12})(R^{13})$;
$X^2$ is O or alkylene;
each $R^{11}$ and $R^{12}$ independently is alkyl;
$R^{13}$ is alkyl or $-X^3-Si(R^{14})(R^{15})(R^{16})$;
each $R^{14}$, $R^{15}$, and $R^{16}$ independently is alkyl;
$X^3$ is O or alkylene;
n is 1, 2, or 3; and
m is 0 or 1;
with proviso that when m is 0 and $R^3$ is alkyl, $X^1$ is $-Si(R^{11})(R^{12})(R^{13})$.

2. The compound of claim 1, wherein m is 1; and n is 1 or 2.

3. The compound of claim 2, wherein $R^3$ is $C_1$ to $C_6$ alkyl.

4. The compound of claim 2, wherein each of $R^4$ and $R^6$ is $-CH_2-$.

5. The compound of claim 2, wherein each of $R^1$, $R^2$, $R^3$, $R^{11}$, and $R^{12}$ is methyl.

6. The compound of claim 2, wherein each $R^5$ independently is $C_2$ to $C_3$ alkylene.

7. The compound of claim 2, wherein $X^1$ is H.

8. The compound of claim 1, wherein m is 1; n is 1 or 2; each of $R^1$, $R^2$, $R^3$, $R^7$, $R^8$, $R^9$, $R^{11}$, $R^{12}$, and $R^{13}$ is methyl; each $R^5$ is $C_2$ to $C_3$ alkylene; and each of $R^4$ and $R^6$ is $-CH_2-$.

9. The compound of claim 1, wherein m is 1; n is 1 or 2; and $R^3$ is $-X^2-Si(R^7)(R^8)(R^9)$.

10. The compound of claim 9, wherein each $X^2$, $R^4$ and $R^6$ is $-CH_2-$.

11. The compound of claim 9, wherein $R^{13}$ is $-X^3-Si(R^{14})(R^{15})(R^{16})$; and each of $R^1$, $R^2$, $R^7$, $R^8$, $R^9$, $R^{11}$, $R^{12}$, $R^{14}$, $R^{15}$, and $R^{16}$ is methyl.

12. The compound of claim 9, wherein each $R^5$ independently is $C_2$ to $C_3$ alkylene.

13. The compound of claim 9, wherein $X^1$ is H.

14. The compound of claim 1, wherein m is 1; n is 1 or 2; $R^3$ is $-CH_2-Si(R^7)(R^8)(R^9)$; each of $R^1$, $R^2$, $R^7$, $R^8$, $R^9$, $R^{11}$, and $R^{12}$ is methyl; $R^{13}$ is methyl or $-CH_2-Si(CH_3)_3$; each $R^5$ independently is $C_2$ to $C_3$ alkylene; and each of $R^4$ and $R^6$ is $-CH_2-$.

15. The compound of claim 1, wherein m is 0; and $R^3$ is $-CH_2-O-C(O)-O-R^{10}$.

16. The compound of claim 15, wherein each of $R^4$ and $R^6$ independently is $C_1$ to $C_6$ alkylene; $X^1$ is H; and $R^{10}$ is $C_1$ to $C_6$ alkyl.

17. An electrolyte for a non-aqueous lithium battery comprising a lithium salt dissolved in a solvent comprising at least one compound of claim 1.

18. The electrolyte of claim 17, wherein the solvent further comprises one or more additional solvent compounds selected from the group consisting of an ether, a carbonate ester, a linear dialkyl carbonate, a cyclic alkylene carbonate, a nitrile, a sulfoxide, a sulfone, a fluoro-substituted linear dialkyl carbonate, a fluoro-substituted cyclic alkylene carbonate, a fluoro-substituted sulfolane, a fluoro-substituted sulfone, and a compound of Formula (II): $(R^{17})(R^{18})(R^{19})Si-CH_2-O-C(O)-O-R^{20}$, wherein each of $R^{17}$, $R^{18}$, $R^{19}$, and $R^{20}$ independently is $C_1$ to $C_6$ alkyl.

19. The electrolyte of claim 17, wherein the lithium salt comprises one or more salt selected from the group consisting of lithium bis(trifluoromethanesulfonyl)imidate, lithium 2-trifluoromethyl-4,5-dicyanoimidazolate, lithium 4,5-dicyano-1,2,3-triazolate, lithium trifluoromethanesulfonate, lithium perchlorate, lithium bis(oxalato)borate, lithium difluoro(oxalato)borate, lithium tetrafluoroborate, lithium hexafluorophosphate, lithium thiocyanate, lithium bis(fluorosulfonyl)imidate, lithium bis(pentafluoroethylsulfonyl)imidate, lithium tetracyanoborate, and lithium nitrate.

20. A lithium electrochemical cell comprising an anode, a cathode, and an electrolyte of claim 17 contacting the anode and cathode.

21. A lithium battery comprising a plurality of the electrochemical cell of claim 20 electrically connected together in series, in parallel, or in both series and parallel.

22. A method of manufacturing a compound of Formula (I) of claim 1, wherein m is 0; the method comprising reacting a silyl alcohol of formula $(R^1)(R^2)(R^3)Si-R^4-OH$, in the presence of an alumina catalyst, with either:
(a) a molar excess of a carbonate of formula $X^1-R^6-O-C(O)-O-R^6-X^1$; or
(b) with a molar excess of a dialkyl carbonate of formula Alkyl-O-C(O)-O-Alkyl to displace one O-Alkyl group of the dialkyl carbonate and form an intermediate compound of formula $(R^1)(R^2)(R^3)Si-R^4-O-C(O)-O-Alkyl$, and then reacting the intermediate with an alcohol of formula $HO-R^6-X^1$, to displace O-Alkyl from the intermediate;
thereby forming the compound of Formula (I) wherein m is 0.

23. The method of claim 22, wherein the alumina catalyst is a basic alumina catalyst and the molar excess of carbonate relative to the silyl alcohol is in the range of about 4:1 to about 10:1.

24. A method of manufacturing a compound of Formula (I) of claim 1, wherein m is 1; the method comprising reacting a silyl alcohol of formula $(R^1)(R^2)(R^3)Si-R^4-OH$ with a molar excess of a dialkyl carbonate of formula Alkyl-O-C(O)-O-Alkyl in the presence of an alumina catalyst to displace one 0-Alkyl group of the dialkyl carbonate and form an intermediate compound of formula $(R^1)(R^2)(R^3)si-R^4-O-C(O)-O-Alkyl$, followed by reacting the intermediate with an alkylene glycol of formula $HO-R^5-OH$, so that each OH group of the alkylene glycol displaces an O-Alkyl group from a molecule of the intermediate to form the compound of Formula (I) wherein m is 1.

25. The method of claim 24, wherein the alumina catalyst is a basic alumina catalyst and the molar excess of carbonate relative to the silyl alcohol is in the range of about 4:1 to about 10:1.

* * * * *